(12) United States Patent
Chatterjee et al.

(10) Patent No.: US 9,479,606 B2
(45) Date of Patent: Oct. 25, 2016

(54) SYSTEM AND METHOD FOR ENHANCED MEDIA BROKERING IN VOIP NETWORK

(71) Applicant: Avaya Inc., Basking Ridge, NJ (US)

(72) Inventors: Manish Chatterjee, West Bengal (IN); Biswajyoti Pal, Maharashtra (IN); Ram Shankar, Coimbatore (IN)

(73) Assignee: Sheridan Ross P.C., Basking Ridge, NJ (US)

( * ) Notice: Subject to any disclaimer, the term of this patent is extended or adjusted under 35 U.S.C. 154(b) by 843 days.

(21) Appl. No.: 13/632,151

(22) Filed: Sep. 30, 2012

(65) Prior Publication Data

US 2014/0095655 A1   Apr. 3, 2014

(51) Int. Cl.
*G06F 15/16* (2006.01)
*H04L 29/08* (2006.01)

(52) U.S. Cl.
CPC ................................. *H04L 67/2809* (2013.01)

(58) Field of Classification Search
USPC .......................................... 709/217, 223–224
See application file for complete search history.

(56) References Cited

U.S. PATENT DOCUMENTS

| 7,180,912 | B1* | 2/2007 | Samarasinghe | 370/474 |
| 7,606,905 | B1* | 10/2009 | Atluri et al. | 709/226 |
| 7,656,866 | B2 | 2/2010 | Banner et al. | |
| 7,899,865 | B2 | 3/2011 | Banner et al. | |
| 2006/0239257 | A1* | 10/2006 | Banner et al. | 370/356 |
| 2006/0251054 | A1* | 11/2006 | Peters et al. | 370/352 |
| 2008/0151878 | A1* | 6/2008 | Liao et al. | 370/356 |

\* cited by examiner

*Primary Examiner* — Philip B Tran
(74) *Attorney, Agent, or Firm* — Sheridan Ross P.C.

(57) ABSTRACT

Mechanisms are provided to broker and control media resources. In particular, solutions are described which broker and control a media request sent from an application server. The media request is received at a device capable of brokering and controlling the media request such that a media server capable of providing the request may be selected. A screening functionality is also presented such that an optimal media server may be selected based on a comparison between information contained in an incoming media request and information contained in a previously provisioned Service Level Agreement; such information may relate to media service and capacity information. Further, solutions are presented to support providing media services in heterogeneous environments where an application server and a media server may communication using different media control protocols.

20 Claims, 12 Drawing Sheets

SYSTEM AND METHOD FOR ENHANCED MEDIA BROKERING IN VOIP NETWORK

FIELD OF THE INVENTION

The present invention is generally directed toward communications and more specifically toward providing interoperability between communication devices that communicate using different communication protocols.

BACKGROUND

Consider a hosted service provider who manages media servers and provides media services on demand for enterprises to be used by application servers. The service provider may provide direct links between the application servers and media servers. So, for example, when a desk-phone makes a call to an application server, which then decides that an announcement should be played, the application server makes a media request to the media server directly, to get allocated media connection information. The application server may then forward the allocated media connection information to the desk phone. Having direct links between the application server and the media servers may result in under-utilization for some media servers and over-utilization for other media servers. A similar issue with respect to under-utilization and over-utilization of media servers may also occur when operating in enterprise environments.

SUMMARY

It is with respect to the above issues and other problems that the embodiments presented herein were contemplated.

In one embodiment, the proposed screening functionality in a media resource broker and controller is capable of controlling media resource usage based on service level agreements that have been established with enterprises. A media resource broker and controller may have access to a service level agreement between an enterprise and hosted media service provider in the form of two sets—a URL group and a Media Qualifier Group. The URL group may contain groups of regular expressions for URLs (Uniform Resource Locator) in which the service level agreement may apply or be valid for. The media qualifier group may contain groups of media qualifications along with the maximum allowed capacities for each of the services provided. A media qualification may be considered as a tuple of media service (eg. conference, announcement, Interactive Voice Response), related Quality of Service (eg. bandwidth, delay, jitter, loss), related media support (eg. supported codecs, support for wideband codecs, support for encryption, dtmf support, support for video). Further, an in one embodiment, the two sets may be of the type—General and Priority. The General set may have general users and the Priority set may have the priority users.

Upon receiving a media request a screener may go through a media qualifier group to determine the eligibility of the user for the requested media qualification (i.e. service, QoS, media support, etc) based on the URL information and the current usage. For example, an enterprise 'abc' may have a service level agreement with two sets—General and Priority. The General set may contain general users in a URL Group, having announcement and conferencing services with reduced multimedia capabilities but higher capacities in qualifier group. In the Priority set, URL Group may contain priority users and the qualifier group may contain conferencing services with greater multimedia capabilities like higher bandwidth, quality, and better encryption.

The screening functionality, may be provided by a screener and/or a screening module, and may have access to the service level agreements to be implemented or managed by the media resource broker and controller along with the current utilized capacities corresponding to the maximum capacities of each service in the service group. The screening functionality may provide interfaces to access a list of service level agreements, query availability of capacities and update utilized capacities. The media resource broker and controller may require access to the service level agreement information so that data can be used by the screening functionality or screening module.

A step by step methodology for a handling a media request may occur as follows. Based on the incoming media request, a media resource broker and controller may query the screener with the domain, service and capacities requested. The screener may look up the existing provisioned service level agreements, which are in the form of tuple of URL Group and Media Qualifier Group, to find the relevant URL Group for the request under consideration. The capacities agreed for, as established by a service level agreement, and the capacities already in use, may be determined using the Media Qualifier Group. If the groups are only present in the General set and there are capacities available to be allocated, the screener returns an indication of general availability. If the groups are present in the Priority and General set and there is available capacity that may be allocated in the priority set, the screener returns an indication of priority availability. If the groups are present in the priority and general set and there are no capacities available to be allocated in Priority set but there are capacities available to be allocated in General set, the screener returns an indication of general availability. If capacities have been exhausted, the screener returns an indication of non-availability and the media resource broker and controller rejects the media request.

The media resource broker and controller may then broker the media request from the application server (based on its own data regarding the pool of Media Servers it manages and general/priority availability), select a media server and forward the request to the same. Upon receiving a response from the media server, the following methodology may be followed. Based on the response, media resource broker and controller may update the screener with the URL, media qualification and capacities allocated. The screener may then look up the existing provisioned service level agreements to find the relevant URL Group for the request under consideration. The corresponding Media Qualifier Group may then be looked up and the capacities utilized corresponding to the service under consideration is incremented.

When the media session is being torn down, the following methodology may be followed. The media resource broker and controller may update the screener with the URL, media qualification and capacities to be de-allocated. The screener may then look up the existing provisioned service level agreements to find the relevant URL Group for the request under consideration. The corresponding Service Group is then looked up and the capacities utilized corresponding to the service under consideration is decremented.

To provide interoperability while enabling media request brokering between application/feature servers and media servers supporting different media control protocols, a media resource broker and controller may be used. The media resource broker and controller may be designed to understand the various media control protocols present in a heterogeneous VOIP network, for example, Media Server Markup Language (MSML) (RFC 4722), Media Control XML (MCTRL) (RFC 5168), H.248, Basic Network Media Services with SIP (RFC 4240).

In one embodiment, the methodology that may be followed by the media resource broker and controller may be as follows. The media resource broker and controller may receive a media request from a feature/application server (for example, the request may be in SIP with media control using RFC 4240). The media resource broker and controller may then parse the request and extract information required for brokering. Such information may be, but is not limited to, originator connection information; services requested for; capabilities supported by the originator; and a protocol of the request. The media resource broker and controller may then save this in a data structure. Data related to the media servers, like terminating media server connection information, services supported, capabilities supported by terminating media server, corresponding capacities, and a media control protocol supported, may already be present in the media resource broker and controller. For example, this information may be provided as part of a provisioning process.

In one embodiment, the above data, or subsets of the above data, may then be provided to the brokering procedure. The brokering procedure selects a media server (for instance, using H.248) for the particular media request. A media request may then be constructed with connection information pertaining to the media resource broker and controller in a media control protocol which the media server supports for the original request from application server. The media request may then be sent to the media server (i.e. in H.248).

In the case of a valid media allocation by the media server, a response from the media server containing media connection information and selected capabilities may be received by the media resource broker and controller. The media resource broker and controller may then extract information from the received media response (i.e. in H.248) and store the extracted information in a data structure.

Using this information, the media resource broker and controller may then construct a media response corresponding to the original media request, in the media control protocol understood by the originating feature/application server (i.e. in SIP with media control using RFC 4240). Throughout this process, error handling on either side is handled with the error messages in corresponding media control protocols.

Consider a service provider environment. If the service provider's media resource broker and controller has the screening and controller functionalities, the media requests from the various enterprises can be filtered, based on a domain name, and may be determined whether their corresponding capacities have been exhausted. Also, the media resource broker and controller may be able to handle multi-protocol media requests and correspondingly control multi-protocol media servers.

In accordance with at least some embodiments of the present invention a method is provided that generally comprises:

receiving a first media request compliant with a first media control protocol;

parsing the first media request and extracting information for brokering;

based on the extracted information, selecting at least one media server;

constructing a second media request, the second media request including connection information and compliant with a second media control protocol of which the selected at least one media server supports; and sending the second media request to the selected at least one media server.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
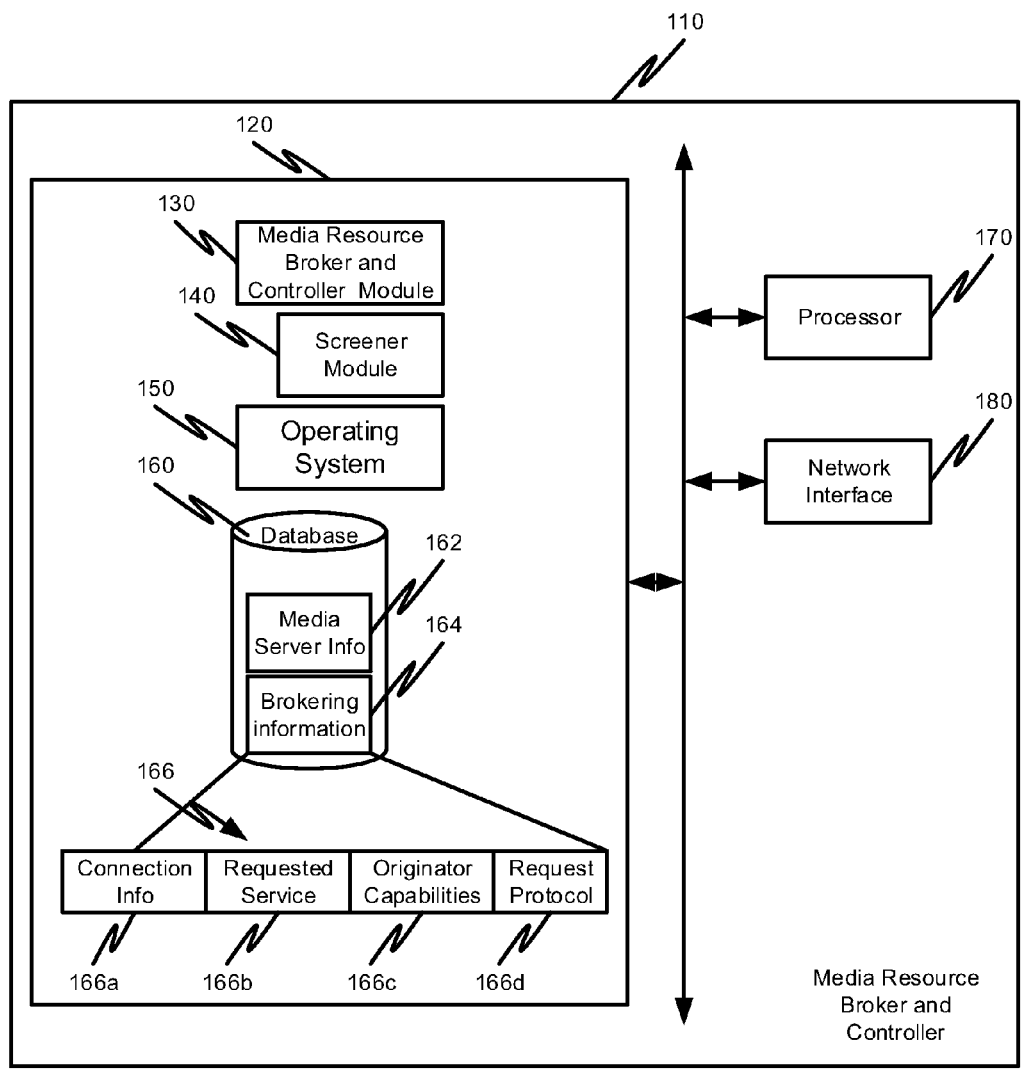
FIG. 1 is a block diagram of a first media resource broker and controller in accordance with embodiments of the present invention.
Figure 2:
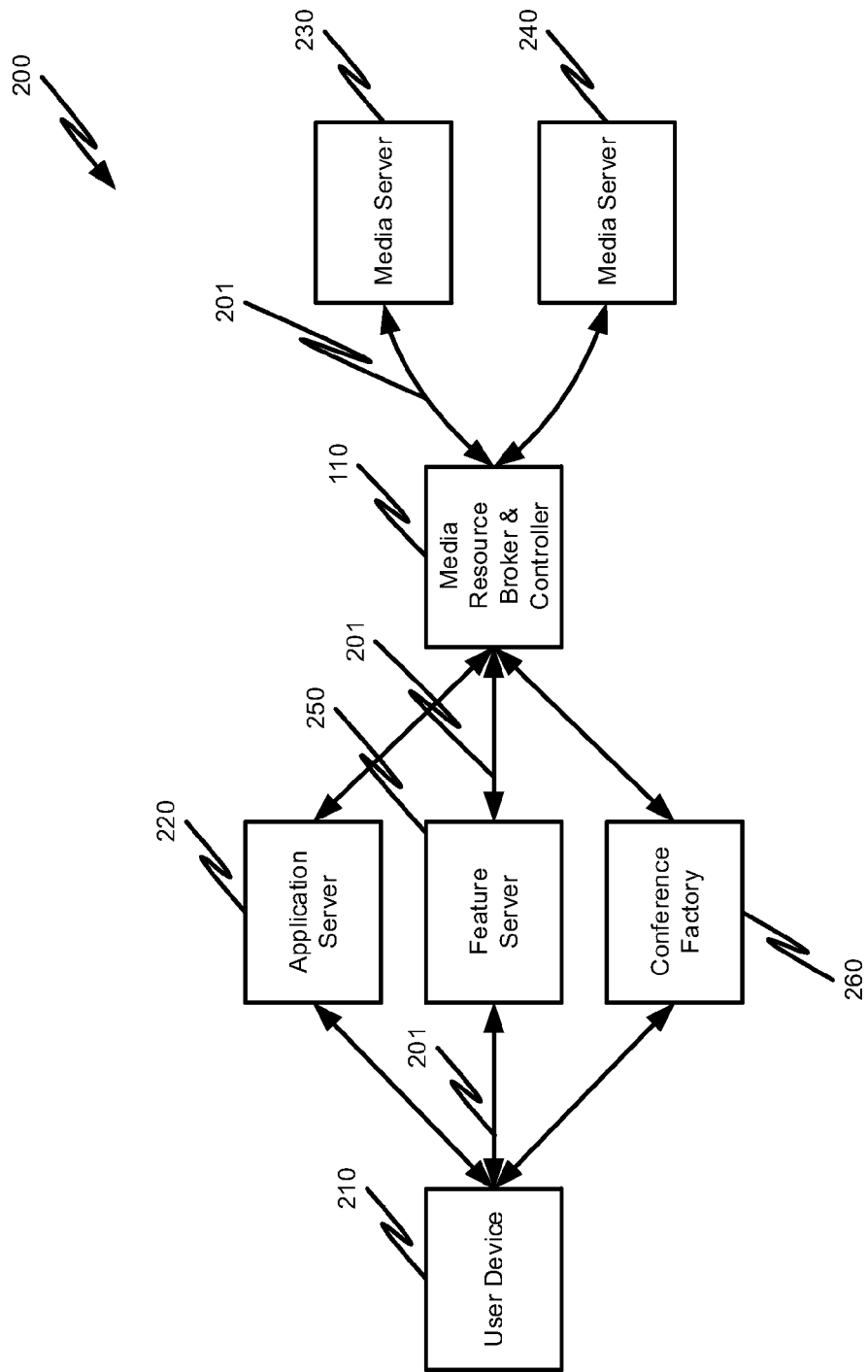
FIG. 2 is a block diagram of a first communication system in accordance with embodiments of the present invention.

FIG. 1 shows an illustrative media resource controller and broker 110 used in connection with at least some embodiments of the present disclosure. Media resource controller and broker 110 may include a processor 170, memory 120, and network interface 180. The processor 170 may include a microprocessor, Central Processing Unit (CPU), a collection of processing units capable of performing serial or parallel data processing functions, and the like. The network interface 180 may allow media resource controller and broker 110 to communicate over a communication medium, such as communication medium 201 as shown in FIG. 2.

The memory 120 may include a number of applications or executable instructions that are readable and executable by the processor 170. For instance, the memory 120 may include instructions in the form of one or more modules and/or applications. The memory 120 may also include data and rules in the form of one or more data structures 166 which can be used by one or more of the modules and/or applications described herein. The data and/or one or more data structures may be stored in database 170, but may also be stored in separate files or databases. Suitable applications include an operating system 150 and various applications, such as a screener module 140 and media resource broker and controller module 110. The operating system 150 is a high-level application which enables the various other applications and modules to interface with the hardware components (e.g., processor 170 and network interface 180) of the media resource broker and control 110.

Although the applications and modules are depicted as software instructions residing in memory 120 and those instructions are executable by the processor 170, one skilled in the art will appreciate that the applications and modules may be implemented partially or totally as hardware or firmware and need not entirely reside within memory 120. For example, an Application Specific Integrated Circuit (ASIC) may be utilized to implement some or all of the functionality discussed herein.

Specific modules which may be included in memory 120 include, without limitation, a media resource broker and controller module 130 and a screener module 140. Although the media resource broker and controller module 130 and the screener module 140 are depicted as residing separately in memory 120, both modules may be combined into the same module or may remain separate and/or operate in different parts of memory 120 or outside of memory 120.

Features offered by the media resource broker and controller 110 include, without limitation, an ability to broker media services and media resources provided by a media server and an ability to control how media services and media resources are allocated to requesting devices.

A media resource broker and controller 110 capable of brokering and controlling media resources, such as media services provided by a media server, such as media server 230, is shown in FIG. 2. In embodiments of the present disclosure and as depicted in FIG. 2, user device 210 may contact application server 220 to use an application, feature, service, and/or resource provided by application server 220. Application server 220, in implementing an application, feature, service and/or resource, may require a media service or media resource provided by a media server, such as media server 230 or media server 240. Application server 220 may or may not have knowledge of the existence of the media server providing the media service or media resource, such as media server 230 or media server 240. Additionally, all media services may be controlled through media broker and controller 110; therefore, application server 220 may structure such a request for a media service in a manner such that the request is directed to media resource broker and controller 110. Alternatively, application server 220 may structure a request for a media resource or service such that the request is intended for media server 230, media server 240 or another supplier of media resources or services that may be accessible by application server 220.

Upon receiving the request from application server 220, media resource broker and controller 110 may process the request, as described below, and send the request received from application server 220 to a media server, such as media server 230 or media server 240. Alternatively, media resource broker and controller 110 may process the request, in a manner consistent with an embodiment described herein, and send a modified or different request to a media server, such as media server 230 or media server 240. Upon receiving a media request from media resource broker and controller 110, a media server may supply the requested media service or media resource to media resource broker and controller 110. Media resource broker and controller 110 then forwards, or supplies, the requested media service or media resource to application server 220. The forwarded or supplied media request may be in a protocol different than the media request received from application server 220. Alternatively or in addition, a media server may forward or supply the requested media service or media resource directly to application server 220. In either case, application server 220 may then utilize the media service or media resource to provide user device 210 with the requested application, feature, service, or resource.

User device 210 may be any user device capable of interacting with a user or providing specific functionality to a user. For example, user device 210 may receive input from a user, provide information to a user, facilitate communication between a user and another user, and may provide or perform combinations thereof. In typical embodiments of the present disclosure, user device 210 may be a phone, personal communication device, networking appliance, personal computer, personal appliance, etc. In some embodiments, two or more user devices 210 may exist. In other embodiments, each user device may be a phone capable of communicating using Session Initiation Protocol (SIP); the SIP phone may comprise a hardware device and/or may be a softphone. One skilled in the art will appreciate that some or all of the user devices may not be the same devices; instead, there may be multiple different user devices within communication environment 200. In some embodiments, user device 210 may be any SIP user agent (UA) used to create and receive SIP messages. User device 210 may further comprise a network interface for communicating over a communication medium 201 with other user devices 210, application servers 220, media resource broker and controller 110, and a media server, such as media server 230 and/or media server 240.

As noted above, application server 220 may be any device capable of providing, serving, or supplying an application, feature, service, or the like. For instance, application server 220 may provide audio, video, interactive voice response (IVR), media, conferencing, business applications, business applications incorporating communications, instant messaging, presence, ringback, smart call screening, billing, forking, quality improvement, automated speech recognition, voice mail, text messaging, chat, call routing, mobile device pairing, coverage, voicemail, and/or any other application or set of applications that enhances or facilitates communications. In some embodiments of the present disclosure and as can be seen in FIG. 2, application server 220 may be a feature server 250, conference factory 260, telephony application server 220, announcement server (not shown), or an instant messaging server (not shown). One of ordinary skill in the art would understand that an application server may not be so limited to that which is described herein. Further, it is to be understood that although application server 220, feature server 250, and conference factory 260 are shown in FIG. 2, embodiments of the present disclosure are not limited as to require all three servers; that is, in some embodiments, only application server 220 is provided while in other embodiments, only feature server 250 is provided. As described above, feature server 250 may be described as an application server, while conference factory 260 may also be described as an application server.

Application server 220 is typically a stored-program controlled system that conventionally includes interfaces to external communication links, a communication switching fabric, memory for storing control programs and data and a processor (i.e., a computer) for executing the stored control programs to control the interfaces and the fabric and to provide application distribution functionality. Application server 220 may further comprise a network interface for communicating over a communication medium 201, to provide applications, services, features, or the like to user devices 210.

Media server 230 and/or media server 240 may be any device capable of providing, serving, or supplying media services or media resources for use by application server 220. The media services provided by media server 230 and/or media server 240 may include, but are not limited to tones, announcements, conferences, IVR, etc. Media server 230 and/or media server 240 may further provide support for different codecs, audio-video support, capacity information, and the like.

Media server 230 and/or media server 240 is typically a stored-program controlled system that conventionally includes interfaces to external communication links, a communication switching fabric, service circuits (e.g., tone generators, announcement circuits, etc.), memory for storing control programs and data and a processor (i.e., a computer) for executing the stored control programs to control the interfaces and the fabric and to provide automatic media distribution functionality. The media server 230 and/or media server 240 further comprises a network interface card to provide media services and/or media resources, over a communication medium 201, to the application servers, user devices and media resource broker and controller. In some embodiments, the media server 230 and/or media server 240 may store and share video, audio, photos, books, movies, presentations, documents, sound clips, user or device logs, announcements, prompts, and/or information collected for a user device or communication system.

In an embodiment consistent with the present disclosure, media resource controller and broker 110 may provide the ability to screen incoming media requests from application server 220, feature server 250, and/or conference factory 260, and manage the media resource or media service usage based on an established service level agreement.

For example, media resource broker and controller 110 may further include screener module 140 which provides the ability to screen media resource or media service requests received from an application server, such as application server 220. In one embodiment, and as shown and described in FIG. 3, screener module 140 has access to service level agreement information, for example, a service level agreement between an enterprise and a hosted media service provider. The service level agreement may contain two sets of information. The first set of information may be a uniform resource language (URL) group containing a group of regular expressions for URLs. The URLs within the URL group may represent the domains or URLs in which the service level agreement is valid. For example, a service level agreement would be valid for abc1.com and abc2.com—the URLs contained within URL group 320, but would not be valid for abc3.com because abc3.com is not contained in the exemplary URL group 320.

Screener module 140 may also have access to service level agreement information that includes Media Qualifier Group information 330, or a second set of information. The media qualifier group 330, may contain specified media qualifications and allowed maximum capacities for each service. A media qualification may be considered a tuple of media services. For example, media qualifier group 330 may contain a service tuple, quality of service tuple, and a media support tuple for differentiated services, qualities of service, and media, for a service level agreement that media resource broker and controller 110 is responsible for handling. The service tuple in media qualifier group 330 may include, without limitation, conference, announcement, interactive voice response (IVR) etc. The quality of service (QoS) tuple may include, without limitation, bandwidth, delay, jitter, loss, etc. The media support tuple may include supported codecs, support for wideband codecs, support for encryption, support for dual-tone multi-frequency signaling (dtmf), support for video, etc.

The URL group 320 and the media qualifier group 330 may further be defined as a general type set and a priority type set. A general type set will include those users belonging to a general group; likewise, a priority type set will include those users belonging to a priority group.

Figure 3:
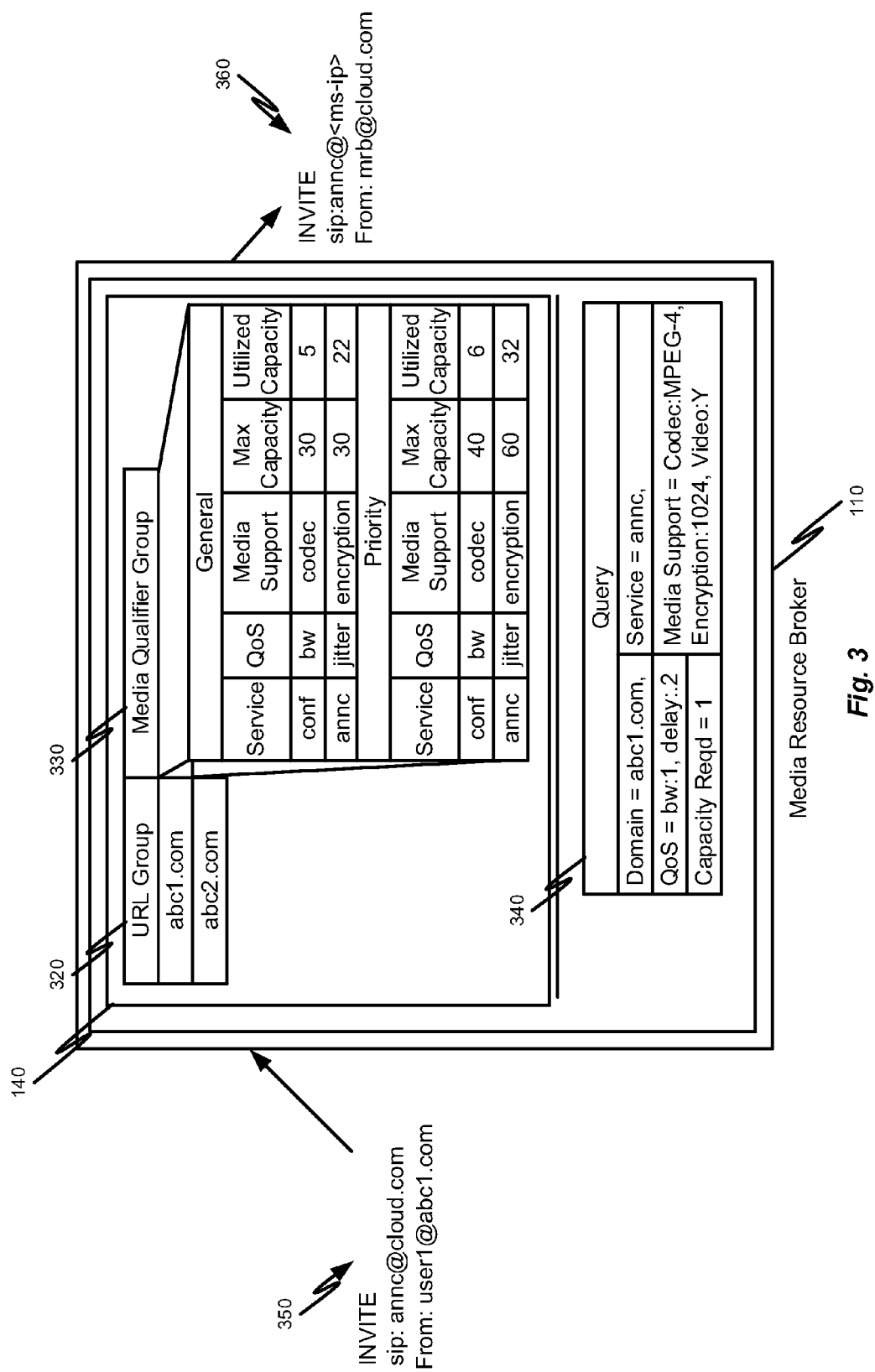
FIG. 3 is a block diagram of a second media resource broker and controller in accordance with embodiments of the present invention.
Figure 4:
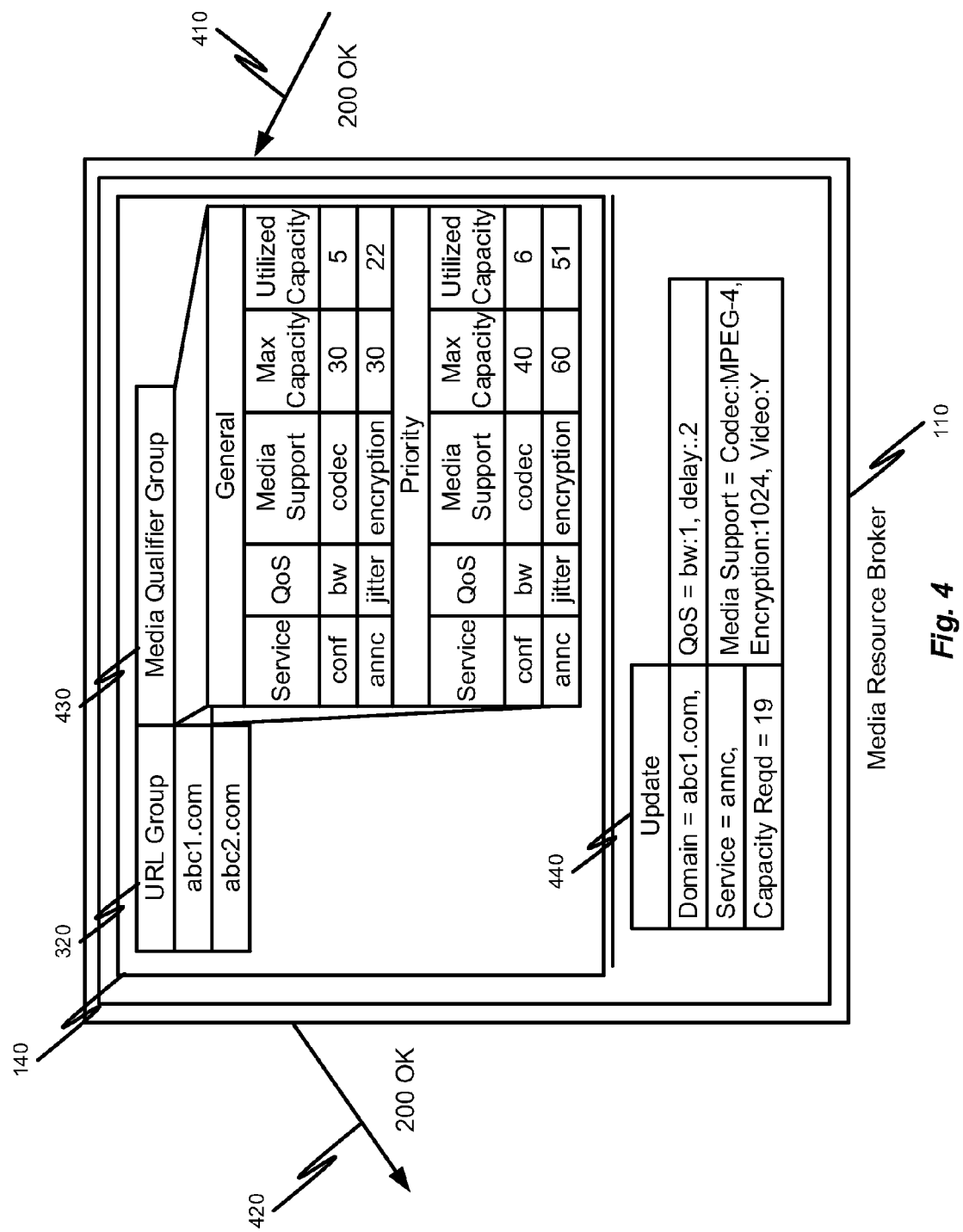
FIG. 4 is a block diagram of a third media resource broker and controller in accordance with embodiments of the present invention.

An exemplary operation of screening module 140 will now be described in connection with FIG. 4. Upon receiving a media request from an application server, for example from application server 220, media resource broker and controller 110 may query the screening module 140 with domain, service, and requested capacity information; such a query may resemble, for example, a query as shown in 340. For instance, a media service request, such as the media service request depicted by 350, may be received at media resource broker and controller 110. Screening module 140 then users the query information provided from media resource broker and controller 110 to compare the URL information contained in the media service request to the URL information contained in the URL group 320. As shown in FIG. 3, invite message 350 is received at media resource broker and controller 110 from user1@abc1.com. Since abc1.com is a member of, or included in URL group 320, URL abc1.com has a valid service level agreement in place with media resource broker and controller 110. Screener module 140 then determines to which grouping, Priority or General, user 1 belongs. In one embodiment, if a user is not listed in the priority group, they are automatically assumed to be a member of the general group.

Distinguishing between users in a priority group and a general group allows media resource broker and controller 110 to control access to media resources at a more granular level. For example, enterprise abc1.com may be operating within a service level agreement wherein members of the general group are allowed access to announcement and conferencing services having reduced multimedia capabilities but higher capacities. Members in the priority group may have access to conferencing services with high quality capabilities—such as higher bandwidth, better encryption, and newer codecs. The sets, general and priority, are provided as examples. As can be appreciated by one skilled in the art, additional groupings may be established to further control the allocation of media resources and/or media services.

In addition to providing URL and service information, the media resource broker and controller 110 may query the screener module 140 requesting a specific service, support, and/or quality. In one embodiment, the query may resemble query 340, where a domain, service, QoS, media support, and capacity may be included. In one embodiment, only those qualifiers different from a group of predefined default qualifiers are included in query 340. For example, query 340 includes domain, service, a desired bandwidth, a desired delay, a desired codec, a desired encryption and video for media support. Additionally, query 340 includes a requested capacity. Screener module 140 may use the information included in the query to determine if the desired media service or media resource is available.

Screener module 140 may also operate in a "best available" mode. For example, if a media request is received by media resource broker and controller 110 and includes a request for a conference service having a bandwidth of 5 MB/s, low jitter and a capacity of 19, a media server, such as media server 230 and/or media server 240, may not be able to support the exact specifications contained in the received media service request or query 340. Instead, media server 230 may be able to provide the necessary resources for a conference service having low jitter, a capacity of 19, and a bandwidth of 4 MB/s. This "best available" match, determined by screener module 140, may be communicated to an application server 220. Alternatively, or in addition, the available resources or available services that are "best available" are determined to be sufficient; the media server then provides the "best available" resources or services to application server 220.

Once a screener module 140 has determined that a media request can be provided based on the services, QoS, media support, and capacities available, screener module 140 returns an indication of availability to media resource broker and controller 110. Media resource broker and controller 110 then brokers the media request received from application server 220 and selects a media server 230 or media server 240 to supply the requested services or resources. The request 360 is then generated by the media resource broker and controller 110 and then transmitted to the selected media server.

Upon receiving request 360 from media resource broker and controller 110, the selected media server may respond to the media resource broker and controller 110 with a message indicating that the media server received the request and is ready to provide the desired media services or media resources to the requesting application server 220 or to the media resource controller and broker 110. Such a response may be, for example, a 200 OK message. Alternatively, or in addition, the selected media sever may respond with a message indicating that the selected media server is unable to provide the desired resources or services as desired by application server 220. Upon this event occurring, media resource broker and controller 110 may select a different media server to provide the desired media services or media resources. Such a selection may occur in a manner similar to that as described above.

In the event media resource broker and controller 110 receives a response from the selected media server, such as media server 230 and/or media server 240, media resource broker and controller 110 updates the screener module 140 with the URL, media qualification and capacities allocated. If the original query 340 will be fulfilled by the selected media server, an update operation 440 is performed upon screener module 140. The update operation 440 may update the utilized capacity, as shown in media qualifier group 430. The update operation 440 may additionally log or record allocation information for future use. The update operation 440 may be performed in accordance with the following steps: upon receiving message 410, media resource broker and controller 110 directs the screener module 140 to allocate the requested resources. For example, media resource broker and controller 110 may provide the screener module with the URL, media qualification and capacities that are to be allocated. Screener module 140 then uses the existing provisioned service level agreements to find the relevant URL group 320 for the request under consideration. The corresponding service group, for example annc, is then determined and the service under consideration is then incremented—according to the depicted example, the utilized capacity is increased by 19.

After, or at the same time the capacity information is updated within screener module 140, media resource broker and controller 110 may send message 420 to the originating application server 220 that originally requested the media services or media resources.

Figure 5:
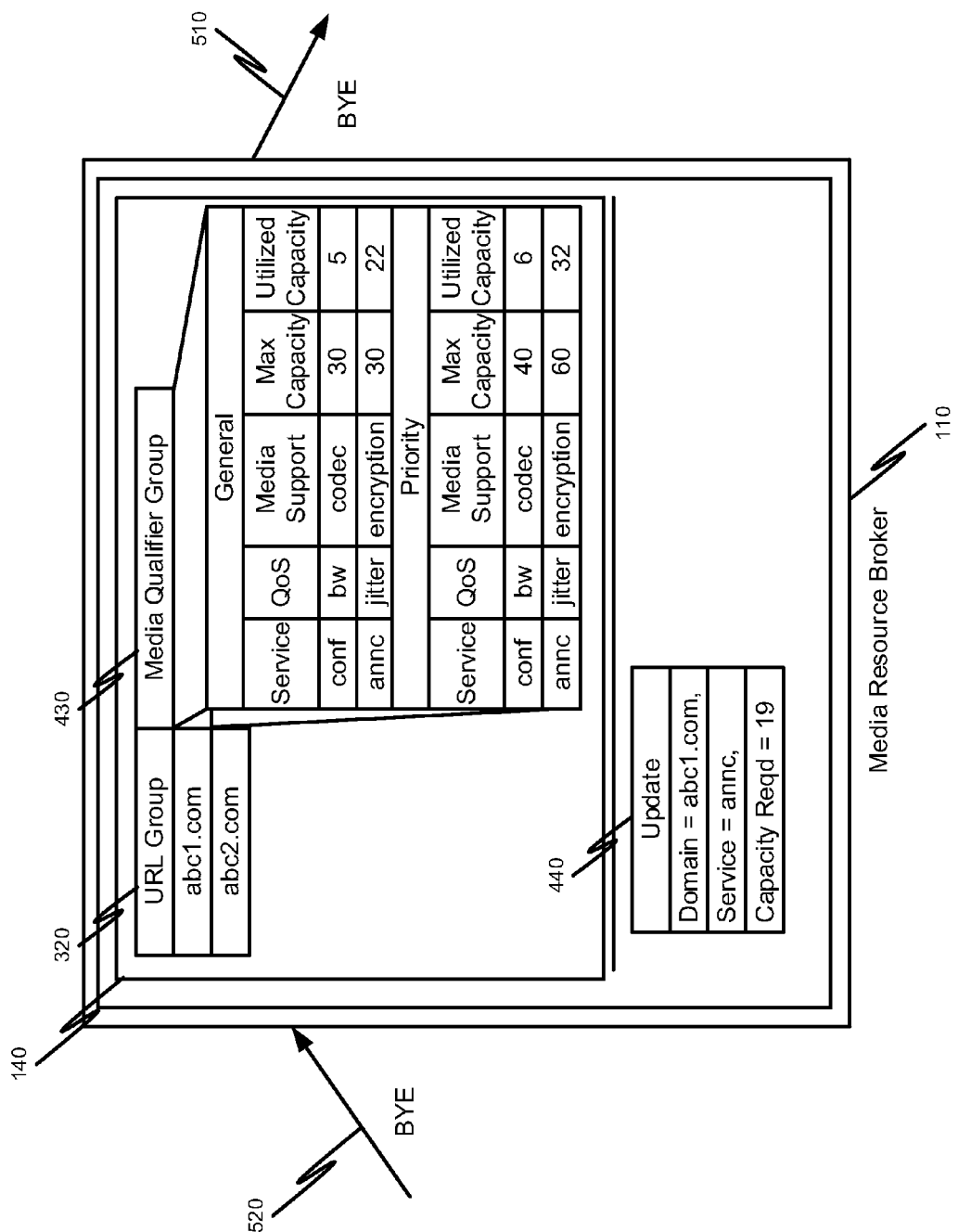
FIG. 5 is a block diagram of a fourth media resource broker and controller in accordance with embodiments of the present invention.

In the event a requesting application server, such as application server 220, no longer requires the previously requested media service or media resource, the once established media session will be torn down. The once established media session may be torn down in a manner similar to FIG. 5. That is, the application server requesting the media resource and/or media service may send media broker and controller 110 a request to tear down the communication session. The request may include a BYE message 520 or any other message indicating the media session is to be dismantled.

Upon receiving message 520, media resource broker and controller 110 may direct the screener module 140 to release the once allocated resources. For example, media resource broker and controller 110 may provide the screener module with the URL, media qualification and capacities that are to be de-allocated. Alternatively, or in addition, the de-allocation and release of resources at screener module 140 may occur after receiving a confirmation message (i.e 200 OK) from the media server that was providing the requested media service. Screener module 140 then uses the existing provisioned service level agreements to find the relevant URL group 320 for the request under consideration. The corresponding service group, for example annc, is then determined and the capacity for the service under consideration is then decremented—for example the utilized capacity is reduced by 19. A BYE message 510 may then be sent to the media server that was providing the requested media service.

Figure 6:
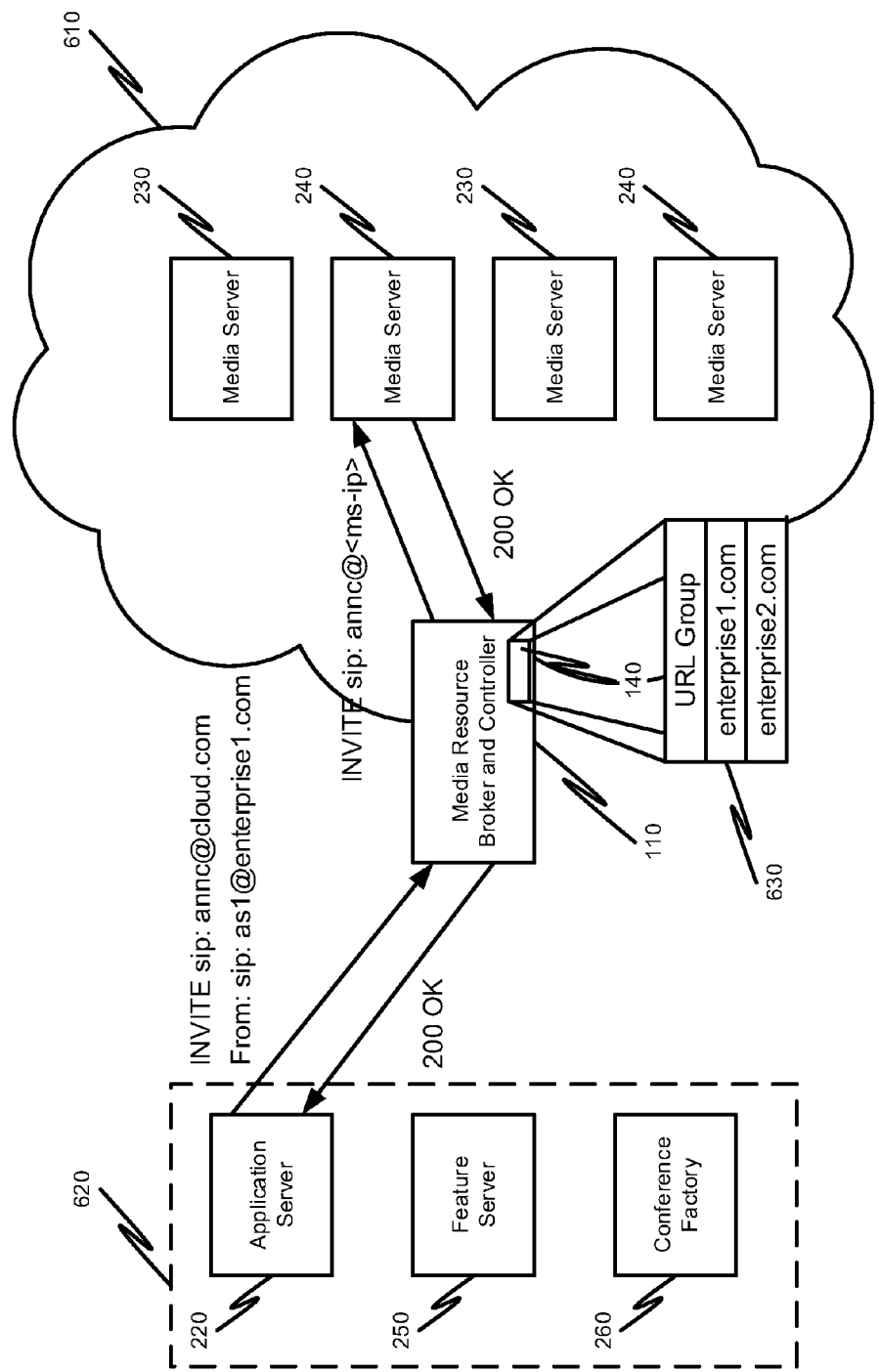
FIG. 6 is a block diagram of a second communication system in accordance with embodiments of the present invention.

FIG. 6 illustrates another embodiment in accordance with the present disclosure. In FIG. 6, a media resource broker and controller 110 manages and brokers resources for a hosted media service provider 610. Hosted media service provider 610 may physically be in a location that is different from an enterprise 620—the enterprise 620 may include application server 220, feature server 250, and conference factory 260. Or, hosted media service provider 610 may be in the same physical location as enterprise 620. A message sent from application server 220, requesting a media resource or media service, may be received by media resource broker and controller 110. According to a valid service level agreement, media resource broker and controller may determine, using the URL group 630 and screener module 140, that user as1@enterprise1.com may access a requested service or resource—in this example, an announcement server. Media resource broker and controller 110 may then send a media request to a media server, such as media server 240. Upon determining that the requested media services can be provided, media server 240 sends a confirmation response, including media resource connection information, to media resource broker and controller 110. Upon receiving a confirmation message from media server 240, media resource broker and controller sends the connection information to the application server that made the original media service or media resource request.

As described above, the response received by media resource broker and controller from application server 220 may be in a different protocol that that which is understood or supported by media server 240. In such an event, media resource broker and controller constructs a media request to send to media server 240, such that media server 240 understands the received request.

Figure 7:
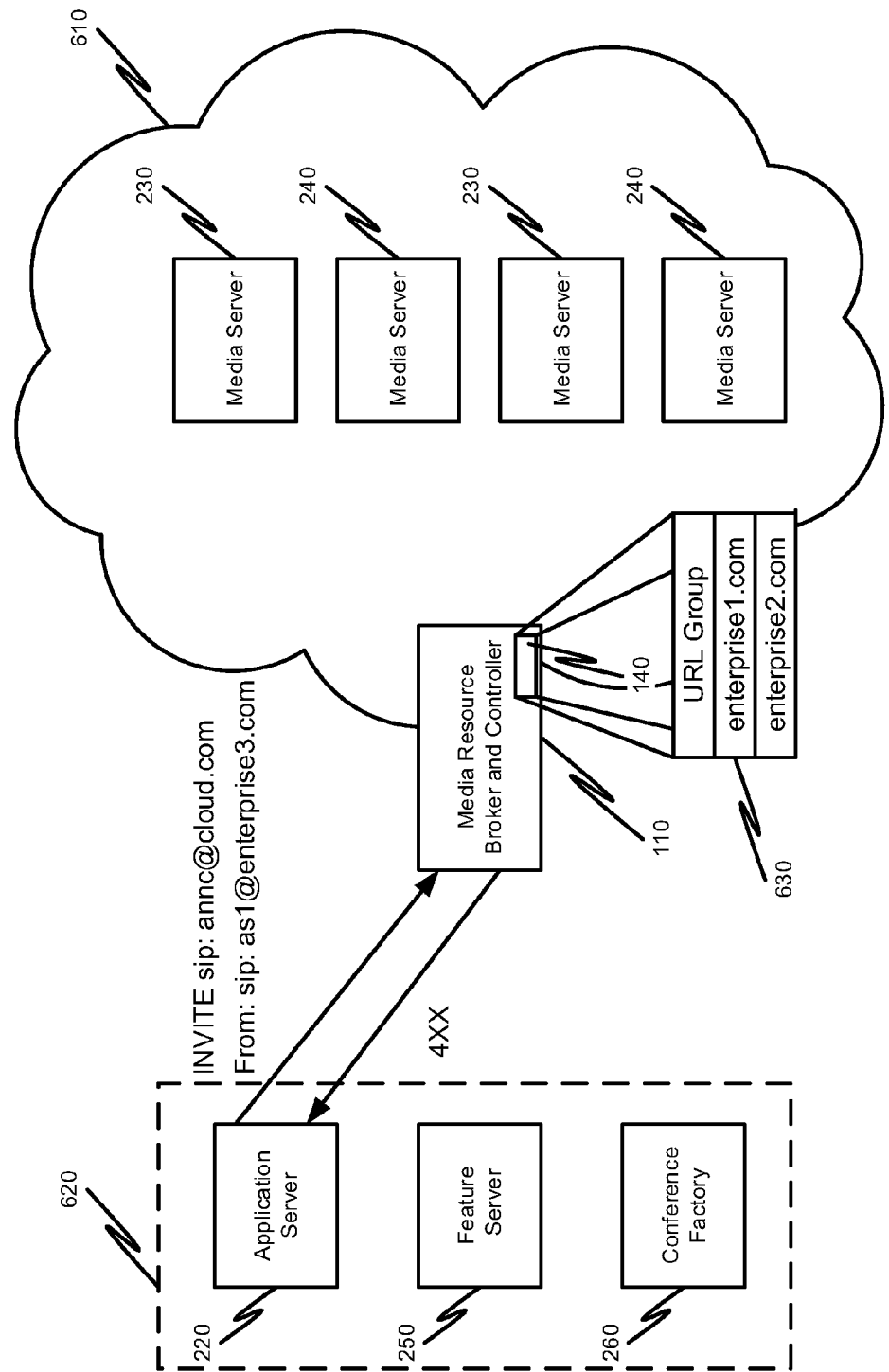
FIG. 7 is a block diagram of a third communication system in accordance with embodiments of the present invention.

As shown in FIG. 7, an application server sends a media resource or media service request to media resource broker and controller 110. In this example, a valid service level agreement is not in effect for the domain or URL enterprise3.com. Therefore, media resource broker and controller 110 may deny the request received from application server 220. Media resource broker and controller 110 may respond with a termination message, such as a 4XX message.

Figure 8:
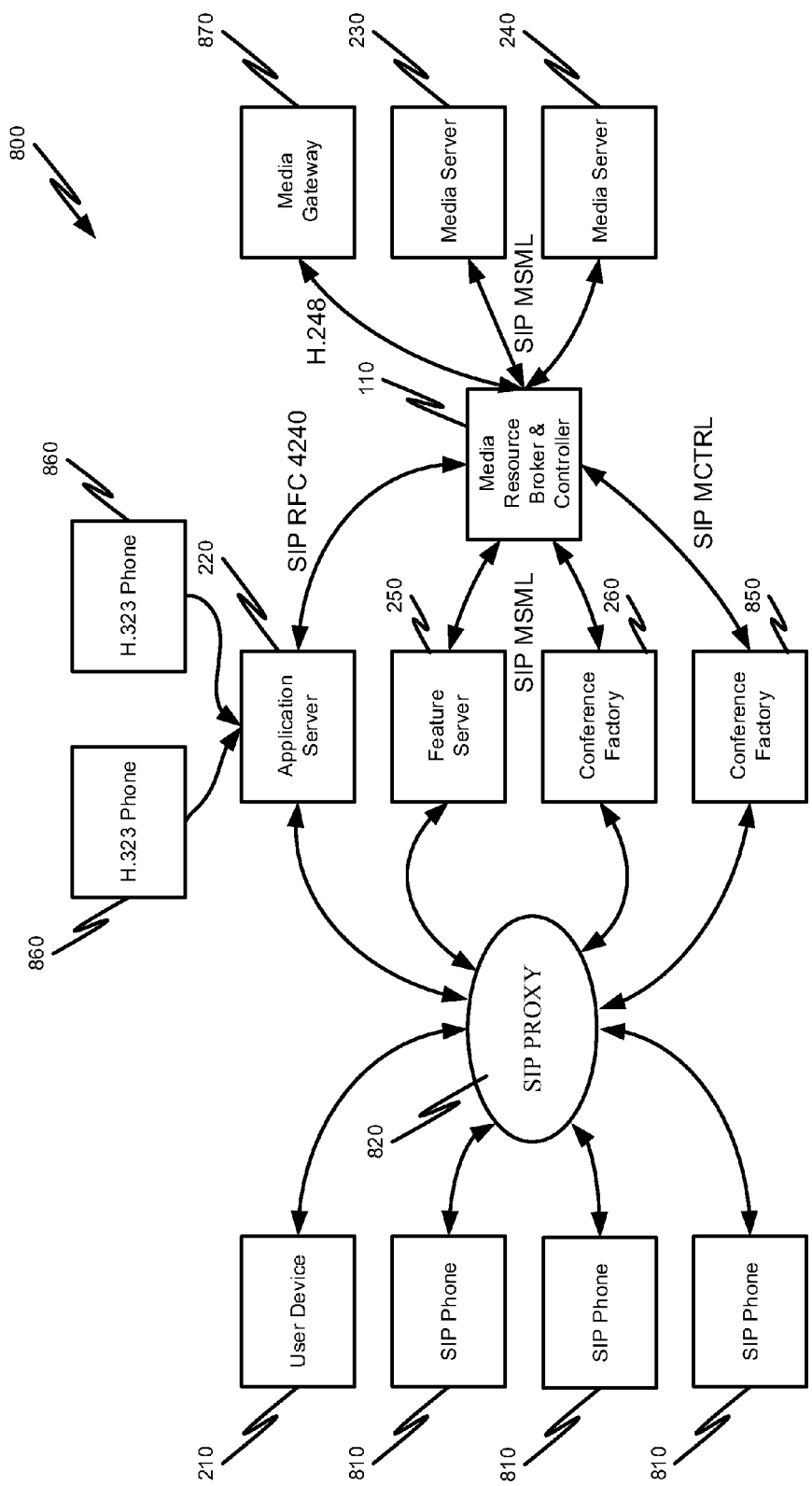
FIG. 8 is a block diagram of a fourth communication system in accordance with embodiments of the present invention.

Similar to the communication environment 200 in FIG. 2, FIG. 8 shows an illustrative communication environment 800 used in connection with at least some embodiments of the present disclosure. In the depicted communication environment 800, SIP Phone 810 communicates with SIP Proxy 820 using a SIP protocol. As depicted in FIG. 8, multiple SIP User Devices 210 or SIP Phones 810 may communicate with SIP Proxy 820. As discussed above, SIP Phone 810 may comprise a hardware device or may be a softphone. Alternatively, or in addition, user device 210 may communicate with SIP Proxy 820. As discussed above, user device 210 may be any SIP user agent (UA) used to create and receive SIP messages.

SIP proxy 820 may be any device that manages the setup of calls between SIP devices (e.g., endpoints) and may generally include one or more of call routing, registration, authorization, network access control and in some cases, network security. As one of ordinary skill in the art can appreciate, SIP proxy 820 may provide additional functions, services, or features not specifically recited herein. In general, SIP proxy 820 is capable of receiving a communication from user device 210 and/or SIP Phone 810. SIP proxy 820 may then forward the received communication to application server 220, feature server 250, conference factory 260, and/or conference factory 850. Alternatively, or in addition, application server 220 is capable of receiving a communication from another user device directly, such as directly from H.323 phone 860 as shown in FIG. 8. It should be noted that a suitable alternative to SIP proxy 820 is a Back-to-Back User Agent (B2BUA) or any similar type of device.

As described herein, application server 220 may be capable of communicating a request for a media service or media resource to media resource broker and controller 110. As can be appreciated by one of ordinary skill in the art, media resource broker and controller 110 may receive a similar request from feature server 250, conference factory 260, and/or conference factory 850, as feature server 250, conference factory 260, and/or conference factory 850 are considered to be application servers.

Media resource broker and controller may also operate utilizing multiple protocols; that is, media resource broker and controller 110 may be a multi-protocol controller designed to receive, process, and transmit various media control protocols that may be present in a heterogeneous voice over IP (VOIP) network. For instance, and by way of a non-limiting example, application server 220 may communicate with media resource broker and controller 110 using a Basic Network Media Services with SIP (RFC 4240), the entire contents of which are hereby incorporated herein by reference. Feature server 250 and conference factory 260 may communicate with media resource broker and controller 110 using a SIP Media Server Markup Language (MSML) (RFC 4722), the entire contents of which are hereby incorporated herein by reference. Conference factory 850 may communicate with media resource broker and controller 110 using SIP Media Control XML (MCTRL) (RFC 5168) the entire contents of which are hereby incorporated herein by reference. As one of ordinary skill in the art can appreciate, other communication protocols, though not described herein, may be utilized by media resource broker and controller 110. Further, media resource broker and controller 110 may include the ability to process the request received from the application server 220, feature server 250, and/or conference factory 260 or conference factory 850, and transmit the request in a protocol understood or required by media server 230 or media server 240—the protocol understood or required by media server 230 or media server 240 and being different than the protocol of the original request received by media resource broker and controller.

It is important to note that the request received by media resource broker and controller 110 from application server 220, and the request sent by the media resource broker and controller 110 to the media server 230 or media server 240, may comprise or comply with different protocols. For example, conference factory 850 may communicate with media resource broker 110 using SIP MCTRL; however, media server 230 or media server 240 may communicate only using SIP MSML. In this example, media resource controller and broker 110 provides the ability to broker the request received from conference factory 850 and transmit the request to media server 230 or media server 240 in a protocol understood by the media server. Similarly, application server 220 may communicate a request for a particular media service to media resource broker and controller 110 using SIP RFC 4240, while media resource broker and controller 110 may communicate the request for the particular media service, requested by application server 110, to media gateway 870 using H.248. This inline brokering of media resource controller and broker 110 effectively provides the ability for the conference factory 850 to communicate with media server 230 using disparate communication protocols.

In one embodiment, media resource broker and controller 110 may parse the request received from application server 220 and extract information for brokering. Information that may assist in brokering the request from application server 220 to media resource broker and controller 110, may include without limitation, the originator connection information 166a, the desired services requested from application server 166b, capabilities supported by application server 166c, and the protocol of the received request 166d. Such information may be extracted from the request and stored in a data structure 166. Data structure 166 may be stored in a database within the memory 120 of media resource broker and controller 110, but is not so required. Data structure 166 may be stored in a device separate from media resource broker and controller 110 and may be accessed using any type of request and response protocol (e.g. SQL).

In one embodiment, database 160 may also include media server information 162. Media server information 162 may include, but is not limited to, terminating media server connection information, services supported by a media server, such as media server 230 and/or media server 240, capabilities supported by the media server, capacity information for a corresponding media server, and the protocol supported by a media server. This information may be stored in a data structure similar to that of data structure 166 and may be stored in database 160 or elsewhere. In some embodiments, media server information 162 is provisioned ahead of time and may be known prior to a received request from an application server 220. In other embodiments, media server information 162 may be requested prior to the media resource broker and controller 110 communicating a media service or media resource request to a media server, such as media 230 or media server 240. In either case, media sever information 162 may be updated throughout a communication session that occurs between media resource broker and controller 110 and a media server, such as media server 230 and/or media server 240. Alternatively, or in addition, media server information 162 may be updated upon the occurrence of a schedule event or the passage of a specific amount of time.

Using the media server information 162 and the brokering information 164, media resource broker and controller 110 may select a media server for the particular media service or media resource request. Media resource broker and controller 110 may select a particular media server based on a variety of different factors, including but in no way limited to, whether application server 220 and a media server, such as media server 230 and/or media server 240, communicate using the same communication protocol; whether a particular media server, such as media server 230, can provide the requested media server or media resource; whether a media server, such as media server 230 or media sever 240, has the capacity to handle the request for a media service or media resource; or whether a media server, such as media server 230 or media server 240, is authorized to provide the media service or media resource to the application server 220 making the media request.

Media resource broker and controller 110, provides the ability to construct a media resource or media service request containing connection information pertaining to the media resource broker and controller 110, in a communication protocol supported by the selected media server for the original request received from application server 220. Media resource broker then provides the ability to send this media request to the selected media server.

Upon a valid allocation of a media resource or media service by a media server, such as media server 230 or media server 240, a response from the selected media server is received at media resource broker and controller 110. In one embodiment, media resource broker and controller 110 may extract the information received from the media response sent by a media server and store this information in a data structure. Media resource broker and controller 110 may store this information in a data structure residing in database 160, or may store this information in a separate location. The information extracted from the response may include media connection information and selected capabilities of the selected media server, such as media server 230 or media server 240.

Using the information extracted from the media server, media resource controller and broker 110 provides the ability to utilize the extracted information and construct a media response corresponding to the original media request sent by application server 220. The response constructed by media resource controller and broker 110, may contain connection information for the media server, such as media server 230 or media server 240, and may be constructed in a communication protocol understood by the originating application server 220. The constructed response may include connection information and may be sent to the originating application server 220 from media resource controller and broker 110.

Figure 9:
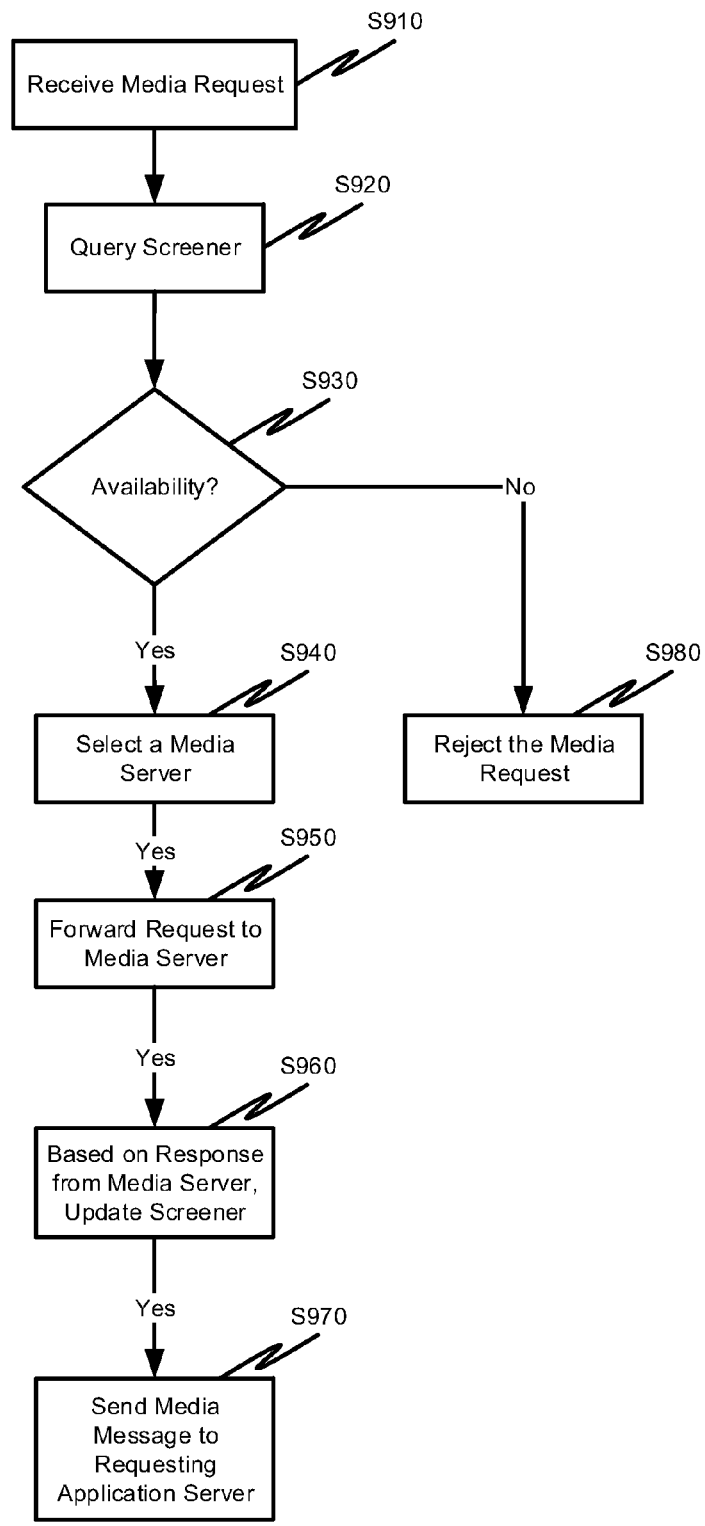
FIG. 9 is a flow diagram depicting a first exemplary communication method in accordance with embodiments of the present invention.

A method of brokering and controlling resources, in accordance with an embodiment of the present disclosure, will now be described in connection with FIG. 9. Upon receiving a media request from an application server (S910), for example from application server 220, media resource broker and controller 110 queries (S920) the screening module 140 with the domain, service, and capacities requested based on the request received from application server 220. For instance, a media service request, such as the media service request depicted by 350, may be received at media resource broker and controller 110. Media resource broker and controller 110 then queries (S920) the screening module 140 and compares the URL information contained in the media service request to the URL information contained in a URL group, such as URL group 320. Screener module 140 then uses a media qualifier group, such as media qualifier group 330, to obtain the capacities of the services requested and determine if the requested media resources or the requested media services are available (S930). If the requested media resources are not available, screener module 140 returns and indication to the media resource broker and controller 110 indicating that the requested resources are not available. Media resource broker and controller 110 then rejects the media request (S980). If however, the requested media resources are available, a media server is selected (S940) and a media request is sent to the selected media server (S950). Upon receiving a valid response from the selected media server, the screening module is updated, by the media resource broker and controller.

With the URL, media qualification and allocated capacities (S960). After, or at the same time the screening module is being updated, media resource broker and controller 110 sends (S970) a media message to the requesting application server, for example server 220. The media message sent to the requesting application server may contain media connection information associated with the selected media server.

Figure 10:
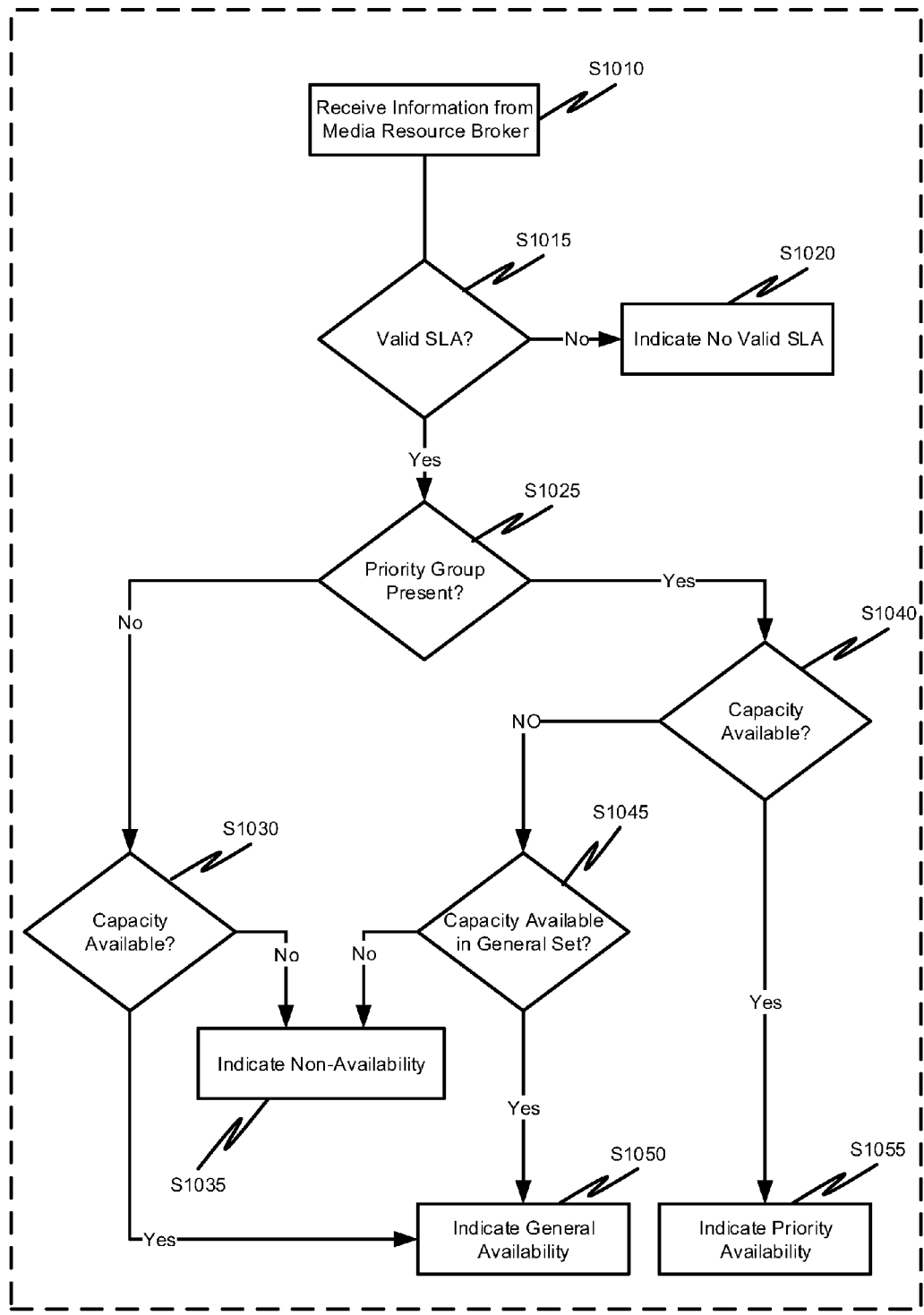
FIG. 10 is a flow diagram depicting a second exemplary communication method in accordance with embodiments of the present invention.

FIG. 10 provides additional detail regarding the screening step S920 in connection with an embodiment of the present disclosure. Upon receiving a media request from an application server, for example from application server 220, media resource broker and controller 110 queries the screening module 140 for available media service or media resources. For instance, a media service request, such as the media service request depicted by 350, may be received at media resource broker and controller 110. Media resource broker and controller 110 then queries the screening module 140 with domain, service, and capacity information. Screening module 140 receives query information from media resource broker and controller 110 (S1010) and may compares the URL information to the URL information contained in the URL group 320 to determine if a valid service level agreement (SLA) exists (S1015). If a valid server level agreement does not exist, screening module 140 may indicate, to media resource broker and controller 110, that a valid SLA does not exist (S1020). Screener module 140 then determines to which grouping, Priority or General, a user belongs (S1025).

In one embodiment, if screening module 140 determines that the requesting user belongs to a priority group, screening module 140 then checks whether or not sufficient capacity is available for the media service or media resource requested (S1040). Screening module 140 maintains capacity, resource, service, quality, and support information within a data structure. Such information may be stored for each media server that media resource broker and controller 110 has access to or interacts with. Further, a media resource or media service request may be fulfilled by multiple media servers; that is, more than one media server may be grouped to provide the service or resource request.

If the requested capacity is available, screening module 140 returns an indication of priority availability (S1055) to media resource broker and controller 110. If the requested capacity is not available, and the requesting user belongs to a priority group, screening module 140 checks whether sufficient capacity, for the requested service, is available in the general group (S1045). If the requested capacity is not available in the general group, media screener 140 returns an indication of non-availability (S1035) to media resource broker and controller 110. If the requested capacity is available, screening module 140 returns an indication of general availability (S1050) to media resource broker and controller 110.

Alternatively, or in addition, if screening module 140 determines that the requesting user belongs to a general group (S1025), screening module 140 then checks whether or not sufficient capacity is available for the media service or media resource requested (S1030). If the requested capacity is available, screening module 140 returns an indication of general availability (S1050) to media resource broker and controller 110. If the requested capacity is not available, media screener 140 returns an indication of non-availability (S1035) to media resource broker and controller 110.

Figure 11:
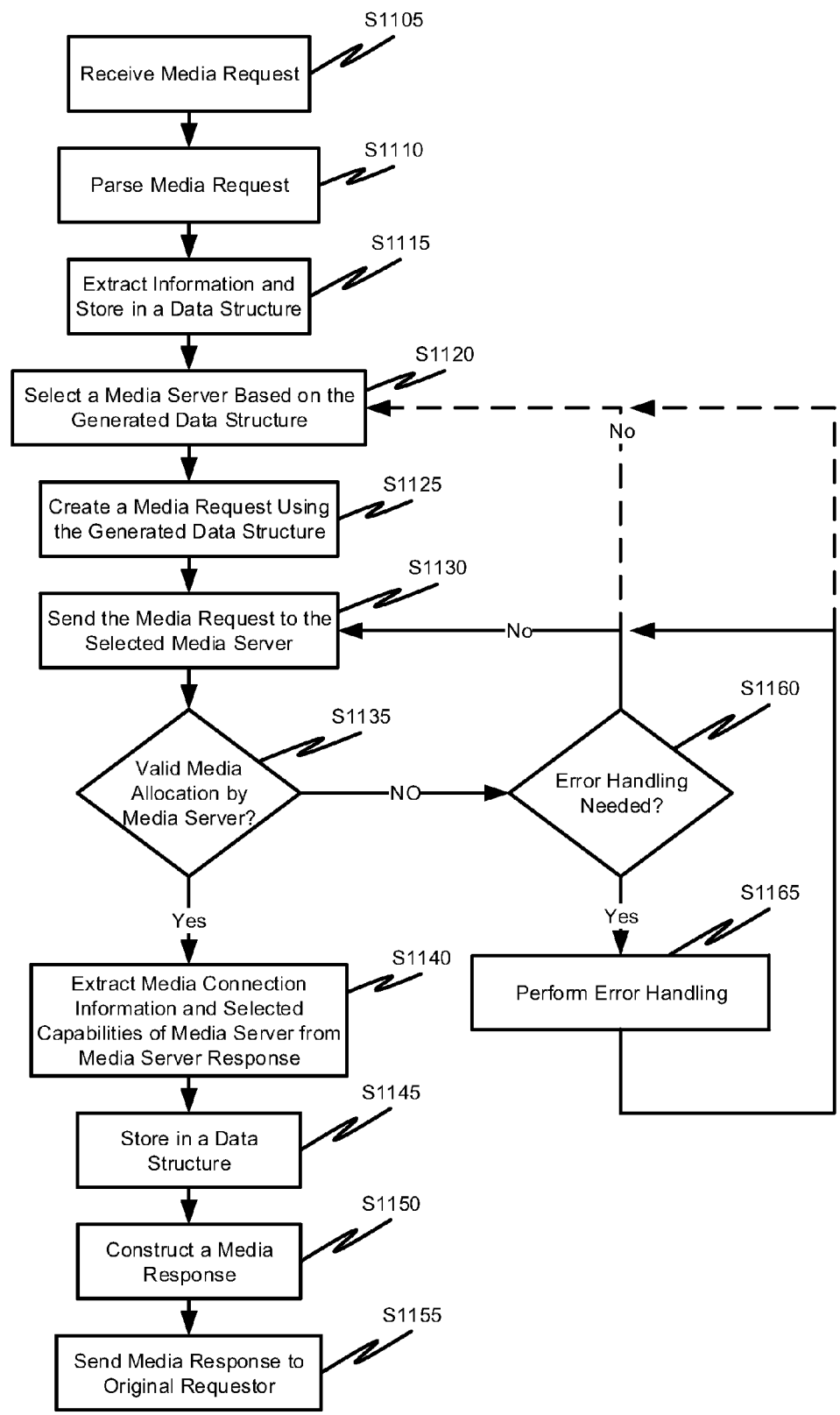
FIG. 11 is a flow diagram depicting a third exemplary communication method in accordance with embodiments of the present invention.

A method of brokering and controlling resources, in accordance with an embodiment of the present disclosure, will now be described in connection with FIG. 11. Media resource broker and controller 110 receives a media request (S1105) from an application server 220. Application server 220 may be a feature server 250, and/or conference factory 260. Media resource broker and controller 110 may parse the request (S1110) received from application server 220 and extract information for brokering (S1115). Information that may assist in brokering the request from application server 220 to media resource broker and controller 110, may include without limitation, the originator connection information 166a, the desired services requested from application server 166b, capabilities supported by application server 166c, and the protocol of the received request 166d. Such information may be extracted from the request and stored in a data structure 166. Data structure 166 may be stored in a database within the memory 120 of media resource broker and controller 110, but is not so required. Data structure 166 may be stored in a device separate from media resource broker and controller 110.

In one embodiment, database 160 may also include media server information 162. Media server information 162 may include, but is not limited to, terminating media server connection information, services supported by a media server, such as media server 230 and/or media server 240, capabilities supported by the media server, capacity information for a corresponding media server, and the protocol supported by a media server. This information may be stored in a data structure similar to that of data structure 166 and may be stored in database 160 or elsewhere. In some embodiments, media server information 162 is provisioned ahead of time and may be known prior to a received request from an application server 220. In other embodiments, media server information 162 may be requested prior to the media resource broker and controller 110 communicating a media service or media resource request to a media server, such as media 230 or media server 240. In either case, media sever information 162 may be updated throughout a communication session that occurs between media resource broker and controller 110 and a media server, such as media server 230 and/or media server 240. Alternatively, or in addition, media server information 162 may be updated upon the occurrence of a schedule event or the passage of a specific amount of time.

Using the media server information 162 and the brokering information 164, media resource broker and controller 110 may select a media server (S1120) for the particular media service or media resource request. Media resource broker and controller 110 may select a particular media server based on a variety of different factors, including but in no way limited to, whether application server 220 and a media server, such as media server 230 and/or media server 240, communicate using the same communication protocol; whether a particular media server, such as media server 230, can provide the requested media server or media resource; whether a media server, such as media server 230 or media sever 240, has the capacity to handle the request for a media service or media resource; or whether a media server, such as media server 230 or media server 240, is authorized to provide the media service or media resource to the application server 220 making the media request.

Media resource broker and controller 110, then constructs a media resource or media service request (S1125) containing connection information pertaining to the media resource broker and controller 110, in a communication protocol supported by the selected media server for the original request received from application server 220. Media resource broker then sends the constructed media request to the selected media server (S1130).

Upon a successful valid allocation of a media resource or media service by a media server (S1135), such as media server 230 or media server 240, a response from the selected media server is received at media resource broker and controller 110. In one embodiment, media resource broker and controller 110 may extract the information received from the media response sent by a media server and store this information in a data structure. Media resource controller and broker 110 may store this information in a data structure residing in database 160, or may store this information in a separate location. The information extracted from the response may include media connection information and selected capabilities of the selected media server, such as media server 230 or media server 240.

If, for some reason, requested media resources or media services are not successfully allocated, the media resource broker and controller 110 may determine if error handling is needed or required (S1160). If error handling is not needed or required, media resource broker and controller 110 may return to S1120 to select a desired media server, construct a media request (S1125) and send the media request to the selected media server (S1130). It is noted, that upon performing step S1120, a different media server than the previously selected media server may be selected.

If it is determined that error handling is needed or may be required, media resource broker and controller 110 may perform error handling in step S1165. Typical error handling routines may include, but are not limited to, verifying and/or resolving connectivity issues between media resource broker and controller 110 and the selected media server; performing parsing and extracting of the media request and verifying the parsing and extracting of the media request, as performed in steps 1110 and 1115, is performed correctly; verifying and resolving any issues that may be affect storage of data in database 160; and any other error handling routines that may be deemed necessary. Upon performing error handling (S1165), media resource broker and controller 110 may return to S1120 to select a desired media server, construct a media request (S1125) and send the media request to the selected media server (S1130). It is noted, that upon performing step S1120, a different media server than the previously selected media server may be selected.

Upon receiving a valid response from the selected media server, media resource controller and broker 110 extracts information from the media server response (S1140) and may store the extracted information in a data structure (S1145). Media resource broker and controller 110 then constructs a media response (S1150) corresponding to the original media request sent by the application server, such as application server 220. The response constructed by media resource controller and broker 110, may contain connection information for the media server, such as media server 230 or media server 240, and may be constructed in a communication protocol understood by the originating application server 220. The constructed response may include connection information and is sent to the originating application server 220 from media resource controller and broker 110. The constructed response is then sent to the original requesting application server (S1155), in a media control protocol understood by the originating application server—for example application server 220.

Figure 12:
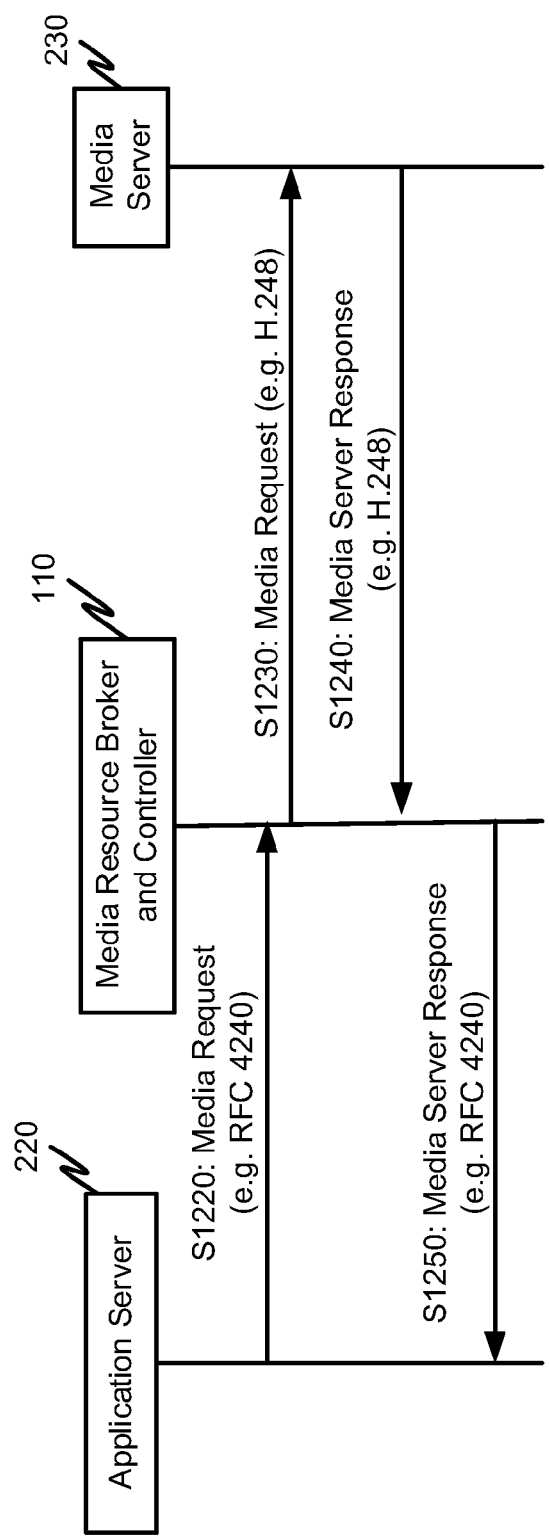
FIG. 12 is a messaging flow diagram depicting a fourth exemplary communication method in accordance with embodiments of the present invention.

FIG. 12 shows an exemplary messaging flow diagram used in connection with at least some embodiments of the present disclosure. Application server 220 may send a media request (S1220) to media resource broker and controller 110. Application server 220 may communicate using an RFC 4240 protocol. As one of ordinary skill in the art can appreciate, application server 220 may be capable of communicating using other protocols. Upon receiving the media request from application server 220, media resource broker and controller processes the request, as previously described, and sends a corresponding media request (S1230) to media server 230. Media server 230 may communicate using an H.248 protocol; therefore media resource broker and controller may send the corresponding media request (S1230) using an H.248 communication protocol.

Upon receiving a media request, media server 230 may respond to the media resource broker and controller (S1240). Since media server 230 may only communicate using H.248, the response from media server 230 to media resource broker and controller 110 may be consistent with an H.248 protocol. Media resource broker and controller 110, upon receiving a response from media sever 230, may process the response, as previously described, and send the processed response to the requesting or originating application server 220 (S1250). Since application server 220 may only communicate using an RFC 4240 protocol, media resource broker and controller 110 may translate or construct the response received from media server 230 into an RFC 4240 compliant message; media resource broker and controller 110 may send the RFC 4240 compliant response to application server 220 (S1250).

There are many advantages to operating in a brokered media service and/or media resource environment, such as the environment depicted in FIG. 8. Such advantages may include but are not limited to, providing the ability to upgrade an application server, feature server, conference factory or the like without requiring an upgrade to existing media servers because of differences in communication protocols; providing the ability to upgrade a media server without requiring an upgrade to an application server, feature server, conference factory or the like when because of differences in communication protocols; providing media services and/or media resources on a first media server, while providing redundant, backup, or failover media services or media resources on a second media server, where the second media server operates using a communication protocol that is different than the first media server; providing the ability to operate in a heterogeneous environment, where communication protocols amongst applications servers may be different and/or communication protocols amongst media servers may be different.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for brokering a request between an application server and a media server, the method comprising:
    receiving a first media request for at least one of a requested media service or media resource, wherein the first media request is compliant with a first protocol;
    parsing the first media request and extracting brokering information, the brokering information including identification information associated with a requesting user;
    determining a media qualifier group based on the identification information associated with the requesting user;
    retrieving at least one of a service type, a quality of service, or media support information based on the media qualifier group;
    determining that one or more media servers are available based on capacity information included in the first media request and the retrieved at least one of the service type, the quality of service, or the media support information;
    selecting at least one media server from the one or more available media servers;
    constructing a second media request for the at least one of the requested media service or media resource from the first media request, wherein the second media request includes connection information associated with the selected at least one media server and is compliant with a second protocol of which the selected at least one media server supports, wherein the second protocol is different from the first protocol; and
    sending the second media request to the selected at least one media server.

2. The method of claim 1, further comprising:
    receiving a first media response from the selected at least one media server;
    extracting availability information from the first media response; and
    constructing a second media response that is compliant with the first protocol and is based on the extracted availability information.

3. The method of claim 2, wherein the first media response from the selected at least one media server further includes media connection information.

4. The method of claim 1, wherein the first media request is received from the application server.

5. The method of claim 1, wherein the brokering information includes at least one of an originator connection information, requested services, or capabilities of the application server.

6. The method of claim 1, further comprising:
    determining an eligibility of the first media request based on the identification information associated with the requesting user, wherein the brokering information includes at least one of a Uniform Resource Locator or a service type.

7. The method of claim 1, further comprising:
    determining a second media qualifier group based on the identification information associated with the requesting user;

retrieving at least one of a second service type, a second quality of service, or second media support information based on the second media qualifier group;

determining that additional media servers are available based on the capacity information included in the first media request and the retrieved at least one of the second service type, the second quality of service, or the second media support information, wherein the one or more available media servers are different from the additional media servers.

8. The method of claim 7, further comprising:

receiving a first media response from the selected at least one media server, wherein the first media response indicates that the selected at least one media server is not available.

9. A computer-readable memory having stored thereon one or more instructions that cause a computing system to execute a method, the method comprising:

receiving a first media request for at least one of a requested media service or media resource, wherein the first media request is compliant with a first protocol;

parsing the first media request and extracting brokering information, the brokering information including at least identification information associated with a requesting user;

determining a media qualifier group based on the identification information associated with the requesting user;

retrieving at least one of a service type, a quality of service, or media support information based on the media qualifier group;

determining that one or more media servers are available based on capacity information included in the first media request and the retrieved at least one of the service type, the quality of service, or the media support information;

selecting at least one media server from the one or more available media servers;

constructing a second media request for the at least one of the requested media service or media resource from the first media request, wherein the second media request includes connection information associated with the selected at least one media server and is compliant with a second protocol of which the selected at least one media server supports, wherein the second protocol is different from the first protocol; and sending the second media request to the selected at least one media server.

10. The computer-readable memory of claim 9, further comprising:

receiving a first media response from the selected at least one media server;

extracting availability information from the first media response; and constructing a second media response that is compliant with the first protocol and is based on the extracted availability information.

11. The computer-readable memory of claim 10, wherein the first media response from the selected at least one media server further includes media connection information.

12. The computer-readable memory of claim 9, wherein the first media request is received from an application server.

13. The computer-readable memory of claim 12, wherein the brokering information includes at least one of an originator connection information, requested services, or capabilities of the application server.

14. The computer-readable memory of claim 9, further comprising:

determining the media qualifier group based on the identification information associated with the requesting user and a service level agreement, wherein the brokering information includes at least one of a Uniform Resource Locator or service type.

15. A system comprising:

a communication interface; and a media resource broker and controller configured to receive, via the communication interface, a first media request for at least one of a requested media service or media resource and is compliant with a first protocol, parse the first media request and extract brokering information, wherein the brokering information includes identification information associated with a requesting user, determine a media qualifier group based on the identification information associated with the requesting user, retrieve at least one of a service type, a quality of service, or media support information based on the media qualifier group, determine that one or more media servers are available based on capacity information included in the first media request and the retrieved at least one of the service type, the quality of service, or the media support information, select at least one media server from the one or more available media servers, construct a second media request for the at least one of the requested media service or media resource from the first media request, wherein the second media request includes connection information associated with the selected at least one media server and is compliant with a second protocol of which the selected at least one media server supports, and sends, via the communication interface, the second media request to the selected at least one media server, wherein the second protocol is different from the first protocol.

16. The system of claim 15, wherein the media resource broker and controller is further configured to receive a first media response from the selected at least one media server, extract availability information from the first media response, and construct a second media response, the second media response being compliant with the first protocol and based on the extracted availability information.

17. The system of claim 16, wherein the first media response from the selected at least one media server further includes media connection information.

18. The media resource broker and controller of claim 15, wherein the first media request is received from an application server.

19. The media resource broker and controller of claim 18, wherein the brokering information includes at least one of an originator connection information, requested services, or capabilities of the application server.

20. The system of claim 15, wherein the media resource broker and controller module is further configured to determine the media qualifier group based on the identification information associated with the requesting user and a service level agreement, wherein the brokering information includes at least one of a Uniform Resource Locator or a service type.

* * * * *

UNITED STATES PATENT AND TRADEMARK OFFICE
CERTIFICATE OF CORRECTION

PATENT NO. : 9,479,606 B2  
APPLICATION NO. : 13/632151  
DATED : October 25, 2016  
INVENTOR(S) : Manish Chatterjee, Biswajyoti Pal and Ram Shankar Page 1 of 1

It is certified that error appears in the above-identified patent and that said Letters Patent is hereby corrected as shown below:

On the Title Page

Under (73) Assignee, please delete "Sheridan Ross P.C." and insert --Avaya Inc.-- therein.

Signed and Sealed this  
Second Day of May, 2017

Michelle K. Lee  
*Director of the United States Patent and Trademark Office*